Nov. 22, 1960  J. C. WISTRAND  2,960,713
AUTOMOBILE VACUUM CLEANER
Filed Sept. 23, 1957  2 Sheets-Sheet 1
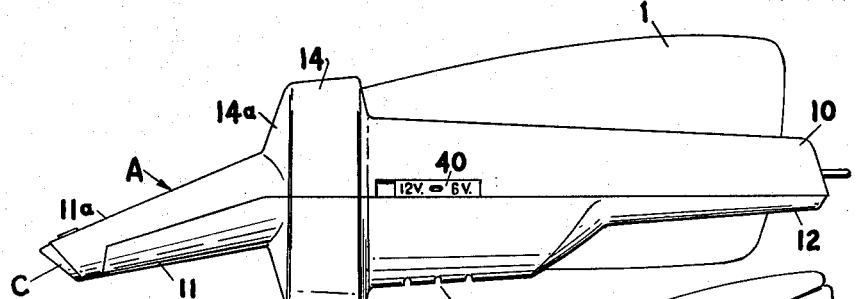
FIG. 1
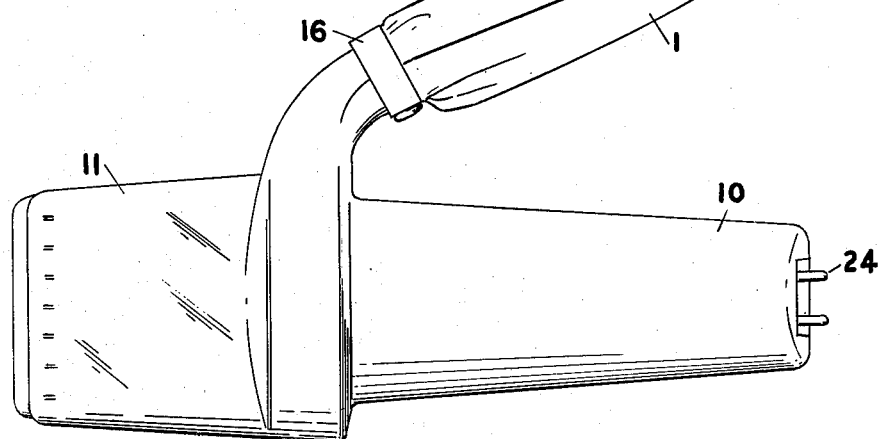
FIG. 2
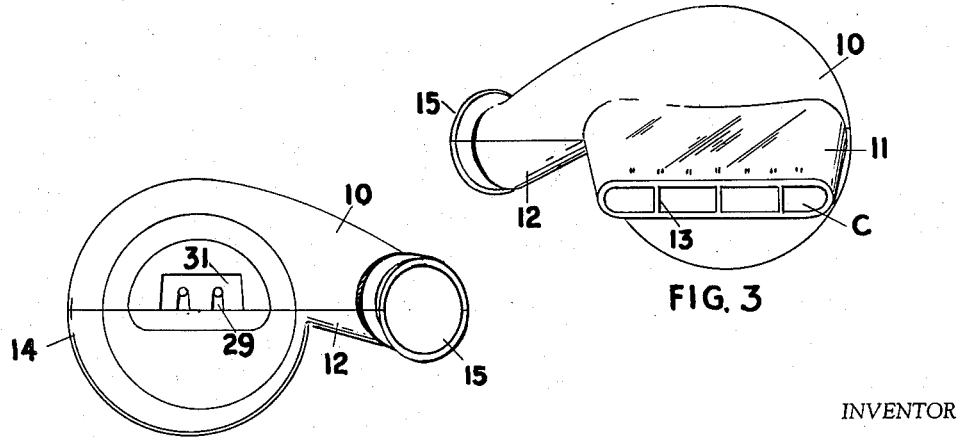
FIG. 3
FIG. 4
INVENTOR
JOHN C. WISTRAND
BY *William F. Woods*
ATTORNEY

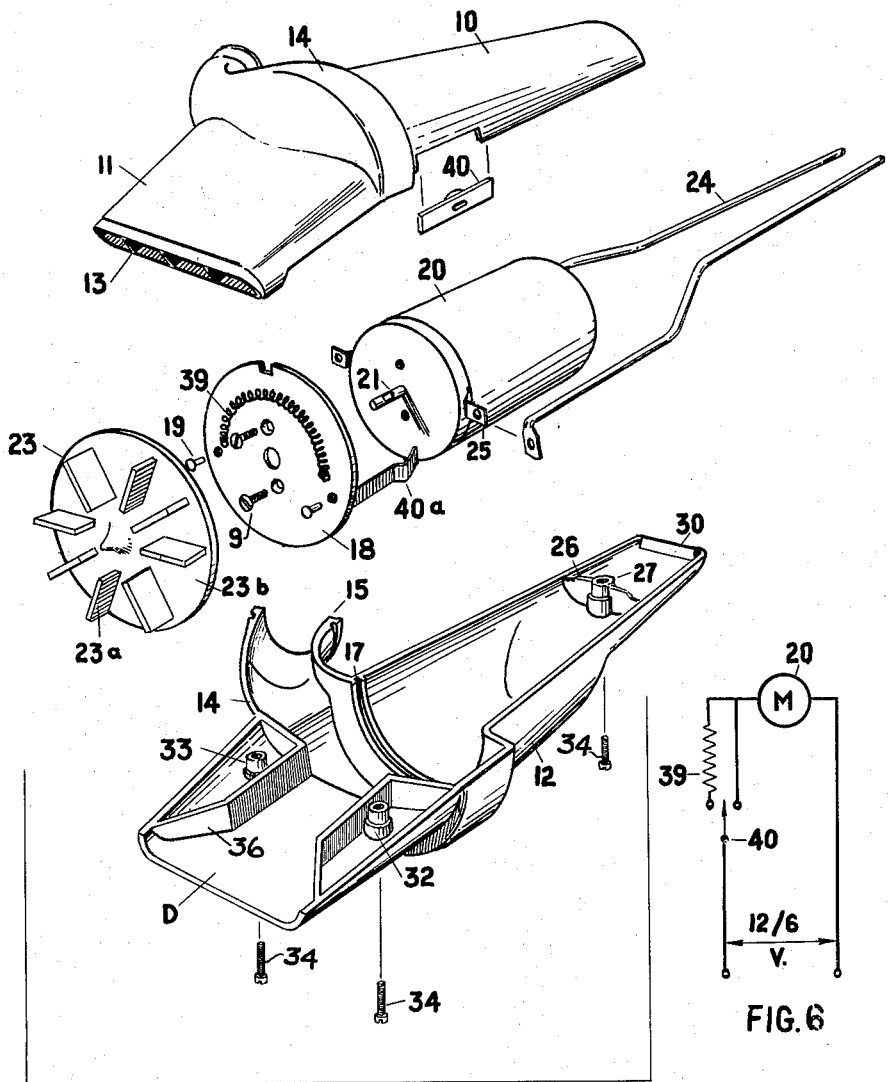

United States Patent Office 2,960,713
Patented Nov. 22, 1960

2,960,713
AUTOMOBILE VACUUM CLEANER

John C. Wistrand, St. Paul, Minn., assignor to Brown & Bigelow, St. Paul, Minn., a corporation of Minnesota Filed Sept. 23, 1957, Ser. No. 685,704

5 Claims. (Cl. 15—344)

This invention concerns a new and improved vacuum cleaner; more particularly it relates to a vacuum cleaner intended for use in motor vehicles and the like. It is characterized by such features as light-weight, relatively small size, and portability to an extent heretofore unknown. Moreover, the design of the unit allows relatively large particles of dirt and coarse material to be picked up, a feature that is important for normal automobile interior cleaning. Other desirable characteristics include a switching system that permits the cleaner to be operated either from a six volt source or from a twelve volt source, the two voltages found on most of today's automobiles. The invention is adapted to be plugged into the cigar lighter of an automobile for use whenever the occasion demands.

Vacuum cleaners currently available are generally of the so-called canister type having wheels for pulling along a flat surface or they are of the upright type primarily adapted for pushing. Both of these types, while ordinarily equipped with a wide variety of accessories and cleaning attachments, are not practical for use as an automobile tool which can be carried in the glove compartment of an average car or behind the spare wheel in the trunk. For one thing, their size and weight militate strongly against such a use. Moreover, the requirement of standard 110 volt, 60 cycle electrical outlets for their operation restricts them to infrequent automobile cleaning operations that are usually planned well in advance.

Other prior art devices include the kind that are connected to a vacuum source such as the intake manifold of an automobile engine, and motor driven hand vacuum cleaners requiring conventional wiring outlets for their operation. The former are necessarily characterized by a low intake pressure differential with a correspondingly low pick-up ability; the latter have the same objections as the household type cleaners being too large for convenient storage and requiring external power for operation.

Consequently, the need for a small size motor driven portable vacuum cleaner that can be conveniently stored in an automobile and energized by means of the automobile's electrical system is apparent. Such a device preferably should be adaptable for use in either a six or twelve volt system and should operate from a convenient outlet such as the cigar lighter receptacle usually found in today's vehicles.

It is therefore a broad object of the present invention to provide an improved vacuum cleaner of the type described.

Another object of this invention is to provide a novel vacuum cleaner characterized by small size and light weight.

A further object of this invention is to provide in a portable vacuum cleaner novel support means for the motor and other parts and at the same time provide an air-tight baffle between the air passageway and the motor housing;

Still another object of this invention is to provide a portable vacuum cleaner novel means for electrically connecting the motor with a source of current;

Another object of this invention is to provide in a portable vacuum cleaner means for adapting the motor for either twelve or six volt operation;

It is another object of this invention to provide a portable vacuum cleaner having an external housing structure so designed as to permit maximum volumetric efficiency consistent with ease of manipulation by the average motorist;

A further object of this invention is the provision of a small compact vacuum cleaner for use in motor vehicles and the like having constructional features that permit ease of manufacture combined with structural rigidity and an overall pleasing exterior shape.

These and other objects will become apparent from a consideration of the accompanying drawings in which is shown an illustrative embodiment of the invention.

In the drawings:

Figure 1 represents a side elevation of the vacuum cleaner with the dust bag attached;

Figure 2 is a plan view of the device of Figure 1;

Figure 3 is a front elevation of the device illustrating the intake scoop;

Figure 4 is a rear elevation of the device;

Figure 5 is an exploded view of the vacuum cleaner; and

Figure 6 is a circuit diagram.

As shown in the several figures, the invention is characterized by a hollow outer casing generally designated by the reference letter A. The casing is preferably molded of a high-impact plastic material such as polystyrene, polyethylene, or the like. It is molded in two sections, the top half 10 and the bottom half 12. The exterior shape of outer casing A includes a shovel-nose scoop 11 having vertical spacers 13 molded integrally therein and a scroll shaped impeller housing 14 terminating in discharge opening 15. A cloth bag 1 removably attached to casing A by elastic strap 16 serves as a receptacle for collecting dirt. A wire support for the cloth bag, although not shown, may be spring wound around discharge opening 15 to hold bag 1 in place and to further secure sections 10 and 12 together.

The internal construction of casing A is shown in detail in Figure 5. Immediately to the rear of housing 14 an annular groove 17 is formed integral with the internal surface of outer casing A. A thin circular-shape baffle 18, made of fiberboard or similar material, is pressed into groove 17. Baffle 18 confines the incoming air and debris to the forward section of casing A, serves as a support for electrical components, and also functions as a mounting platform for motor 20 which is secured thereto by means of screws 19. The manner in which an electrical resistor component 39 is mounted upon baffle 18 is illustrated in Figure 5. A shaft 21 extends forwardly from motor 20 through baffle 18 and connects to impeller 23 by means of a hub (not shown) pressed into impeller 23.

Impeller 23 is of the axial flow centrifugal type having eight radially disposed blades 23a extending perpendicular to base 23b. Impeller 23 is preferably molded of the same type of high impact plastic material as casing A.

Brass contact rods 24 are secured to copper strips 25 by means of rivets 19. Copper strips 25 are connected to motor 20 as shown in Figure 5. Shelf 26 molded into sections 10 and 12 serves both as a support for connecting rods 24 and as a stiffener for screw insert 27. Contact rod 24 extends through the rear of casing A at openings 29 as shown in Figure 4. It should be noted that the protrusion of contact rods 24 through the rear of casing A provides a convenient means of attaching a conventional bayonet type plug and cord set adapted for insertion into the cigar lighter receptacle of an automobile. Further internal structural features of casing A include mating shoulder 30 molded into lower half 12 which engages surface 31 of upper half 10 to allow a tight and well matched fit for the two mating sections fastened together as shown in Figure 4. The mating sections are held together by machine screws 34 which are threaded into inserts 27, 32 and 33.

Switch 40, positioned along the parting line of casing A, provides a convenient means for adapting the unit to either 6 or 12 volt operation. As shown in Figure 6, the switch is of the double pole type and enables or disables resistor 39 to change the voltage into motor 20. The specific construction shown in Figure 5 illustrates the manner in which switch 40 is interconnected to motor 20. A relatively stiff springlike conductor member 40a is attached to the rear of baffle 18 extending therefrom so as to engage a projection of sliding switch 40. Member 40a is connected at its forward end to resistor 39 which in turn is connected to the imput of motor 20. In the operation of this switch, the user slides the button in the 6 volt direction (Figure 1) for 6 volt operation thus shorting out the resistance; conversely sliding switch 40 in the opposite direction causes the current to flow through the resistance and effectively reduce the 12 volt imput to 6 volts. Resistor 39 is preferably made of nichrome wire wound into a coiled position on the forward surface of baffle 18 as shown in Figure 5. The particular characteristics of this resistance, of course, may vary within certain limits. The resistance shown in the drawing is rated at 2.40 ohms and is designed for a load of 10 watts.

The electrical characteristics for the motor used in this invention are also subject to minor variations. The motor illustrated in Figure 5 is of the permanent magnet direct current series wound type having a die cast aluminum or stainless steel housing. Under the load of the eight bladed impeller shown, and operating at a speed of around 9,000 r.p.m., the motor draws around 2½ amperes of current from a 6 volt source. A series of narrow spaced slots 35 located in the bottom half 12 of casing A provides ventilation for motor 20.

In the operation of the present invention the unit is connected to the cigar lighter receptacle by means of an electrical cord (not shown) having a female plug on one end for removable attachment to brass contact rods 24. The other end of the cord is equipped with a standard bayonet type male plug for insertion into the cigar lighter outlet on a vehicle. The cord preferably should be long enough to allow cleaning of the most remote part of the vehicle from the lighter outlet, in most instances this will be the trunk area. A length of fifteen feet has been found suitable for the average vehicle. The design of outer casing A permits cleaning under the front seat as well as around the foot pedals of the average vehicle without difficulty. There is no off-on switch provided in the embodiment shown in the drawing as it is felt that such a refinement is unnecessary for the average motorist. However, it should be understood that no limitation in this regard is intended. After use the cloth bag 1 may be removed, emptied and then reattached by means of strap 16. For storage purposes it is apparent that cloth bag 1 may be folded and compressed when it is empty so as to require a minimum of space. The size of the unit permits it to be stored in the glove compartment of an average automobile ready for use at all times. Thus the device provides a means of keeping a vehicle free of dirt and debris virtually all of the time for it can be used daily if the condition of the vehicle warrants such attention.

Several features of special significance are felt to be worthy of further discussion. In this regard, it should be noted that the intake scoop 11 is so designed as to satisfy a number of unique considerations. For example, the angle between the scroll housing 14 and scoop 11, that is, the "angle of attack," must not be so sharp as to prevent large size and heavy particles from being forced through the impeller into the dust bag. At the same time, if the angle is too flat, the operator will experience discomfort when attempting to clear seats and cushions of the average automobile. Similarly, too flat an angle will cause the outboard surface of the raceway to interfere with the normal contact area of the inlet scoop. All of these considerations have been met by the features of the present invention. The "angle of attack" of scoop 11 is such that maximum intake efficiency is combined with optimum convenience of operation. It has been found that an angle of approximately 115° between the frontal surface 14a of raceway 14 and the upper surface 11a of scoop 11 results in this important advantage. This construction also reduces frictional losses to a minimum.

Debris and dirt, drawn through the intake opening C of scoop 11, pass through the eye of impeller 23 to be discharged through housing 14 and discharge opening 15 into bag 1. The vertical spacers 13 in scoop 11 prevent unduly large particles of dirt from impeding the incoming flow of air and materials while the configuration of the inner passageway D affords maximum volumetric efficiency.

As shown in Figure 5, vertical walls 36 define inner passageway D leading from intake opening C of scoop 11 to housing 14. Clearance is provided in the volute of casing A to allow for the passage therethrough of generous sized particles.

In addition, the structure as disclosed, permits resistor 39 to be subjected to the incoming air circulated by impeller 23 during the operation of the unit. As resistor 39 dissipates a measurable quantity of heat, it is apparent that this arrangement provides additional protection for the motor and othe components that may tend to be heat sensitive. Baffle 18 of course also serves to insulate the motor 20 compartment from dirt and foreign matter that is introduced into the forward section by impeller 23.

It will thus be seen that there has been provided by this invention a vacuum cleaner by which the various objects hereinabove set forth, together with many practical advantages, are successfully achieved. As various possible embodiments may be made of the mechanical features of the present invention, all without departing from the scope thereof, it is to be understood that all material hereinabove set forth or shown in the accompanying drawings, is to be interpreted as illustrative and not in a limited sense.

I claim:

1. A portable vacuum cleaner adapted to be energized by an automotive type electrical system comprising a two-piece outer housing, said housing being divided into a first and a second transverse compartment, the first compartment having an intake scoop terminating in a volute with a discharge opening and having an interior surface defining a passageway therebetween, a removable partition between the first and second compartments in said housing, an electric motor in the second compartment mounted upon said partition, said motor having a shaft extending therefrom through said partition into the volute of the first compartment, an impeller mounted upon the shaft in the volute of the first compartment adapted to draw dirt therethrough from the intake scoop and reject it into the discharge opening, a collection bag releasably attached to said housing at the discharge opening, means including a resistor for changing the effective operating voltage of the motor, said resistor being mounted on the forwardly facing surface of said partition in the first compartment, a pair of contact rods extending from the motor through the housing, said contact rods being adapted to releasably engage means for electrically connecting the same to the cigar lighter of an automobile.

2. A portable vacuum cleaner adapted to be energized through the cigar lighter receptacle of an automobile comprising a sectional hollow outer casing, an independent partition dividing said casing into a front and a rear compartment, the front compartment having a suction inlet and a discharge outlet and having a walled passageway therebetween terminating in a scroll shaped housing, a motor mounted in the rear compartment on said partition and having a shaft extending therethrough, an impeller fastened to the shaft in the housing of the front compartment, a dirt collection bag releasably attached to said casing at the discharge outlet thereof, means including a resistor for changing the effective voltage imput to said motor, said resistor being mounted on the forwardly facing surface of said partition to allow cooling thereof, a pair of elongated electrical contact rods extending from said motor through apertures in the rear wall of said casing, said contact rods being adapted to receive an electrical plug joined to a cord for connecting said rods to the cigar lighter receptacle of an automobile.

3. The device of claim 2 wherein the impeller is characterized by a flat circular base mounted perpendicular to the shaft and having a plurality of radially disposed blades normal to the surface of the base remote from said motor.

4. A portable vacuum cleaner adapted to be connected to the cigar lighter of a motor vehicle, comprising a two piece molded plastic case having an upper half section and a lower half section, said case having an intake nozzle at one end characterized by a rectangular shaped opening, said nozzle having a plurality of spaced vertical webs extending rearwardly from said opening for preventing unduly large particles from entering said case, said case being divided into a front and a rear compartment by a thin circular baffle, a spiral shaped fan housing at the rear of the front compartment, said housing being connected internally to the nozzle of said case by an integral walled corridor, said housing terminating in a discharge opening at one side of said case, a fan rotatable in said fan housing, an electric motor attached to the rear of the partition engageable with said fan, a sliding switch located on the exterior of said casing adjacent said motor, circuit means adapted to provide for operation of said vacuum cleaner at different voltage ratings, a pair of slender elongated contact rods connected to said motor and extending therefrom through the rear of said case, and a collection bag releasably attached to the casing at the discharge opening thereof.

5. A portable vacuum cleaner comprising a plastic case having a rectangular intake nozzle at the leading end, a scroll shaped impeller housing intermediate the leading and trailing ends of said case, said impeller housing having an opening into a discharge bag positioned at one side of said case and a partial rear wall of cylindrical configuration integrally joined to the inner surface of said impeller housing, said rear wall having groove means disposed along its surface facing the longitudinal axis of said case, a circular baffle removably seated within said groove means and transversely separating said case into first and second compartments, an electric motor positioned within said second compartment having the leading end thereof secured to the rearwardly facing surface of said baffle, a shaft extending forwardly from said motor through said baffle and terminating within said impeller housing, a circular impeller rotatably mounted on the forward end of said shaft and within said impeller housing in spaced relationship from the forwardly facing surface of said baffle and said partial rear wall for circulating air currents within said impeller housing, an electric resistor secured to the forwardly facing surface of said baffle in spaced relationship from the rearward surface of said impeller for exposing said resistor to the cooling effect of said air currents and for controlling the electric current to said motor, a pair of elongated metal contact rods extending longitudinally along the sides of said motor and protruding out the trailing end of said second compartment for contact with electrical transmission means extending from the cigarette lighter of an automobile, the forward ends of said rods engaging said motor and baffle for partially supporting said motor, and an electric switch having a resilient contact member mounted on said baffle extending rearwardly therefrom in spaced relation to and parallel with one of said rod members for controlling the electric current to said motor by shunting current directly through the motor or through said resistor.

References Cited in the file of this patent

UNITED STATES PATENTS

| | | |
|---|---|---|
| D. 147,125 | Harvuot | July 15, 1947 |
| 1,210,522 | Orr | Jan. 2, 1917 |
| 1,689,580 | Daddio | Oct. 30, 1928 |
| 1,727,922 | Adams | Sept. 10, 1929 |
| 1,823,726 | Carson | Sept. 15, 1931 |
| 1,986,976 | Kitto | Jan. 8, 1935 |
| 2,027,602 | Marotte | Jan. 14, 1936 |
| 2,046,675 | Daiger | July 7, 1936 |
| 2,130,311 | Parham | Sept. 13, 1938 |
| 2,228,665 | Knopp | Jan. 14, 1941 |
| 2,598,499 | Breuer et al. | May 27, 1952 |
| 2,616,118 | Meyerhoefer | Nov. 4, 1952 |
| 2,665,445 | Foerstel et al. | Jan. 12, 1954 |
| 2,668,315 | Crosby | Feb. 9, 1954 |
| 2,758,330 | Sloan | Aug. 14, 1956 |

FOREIGN PATENTS

| | | |
|---|---|---|
| 538,613 | Great Britain | Aug. 11, 1941 |